Charles D. Warlick &
Marma Duke Ijames.
INVENTOR

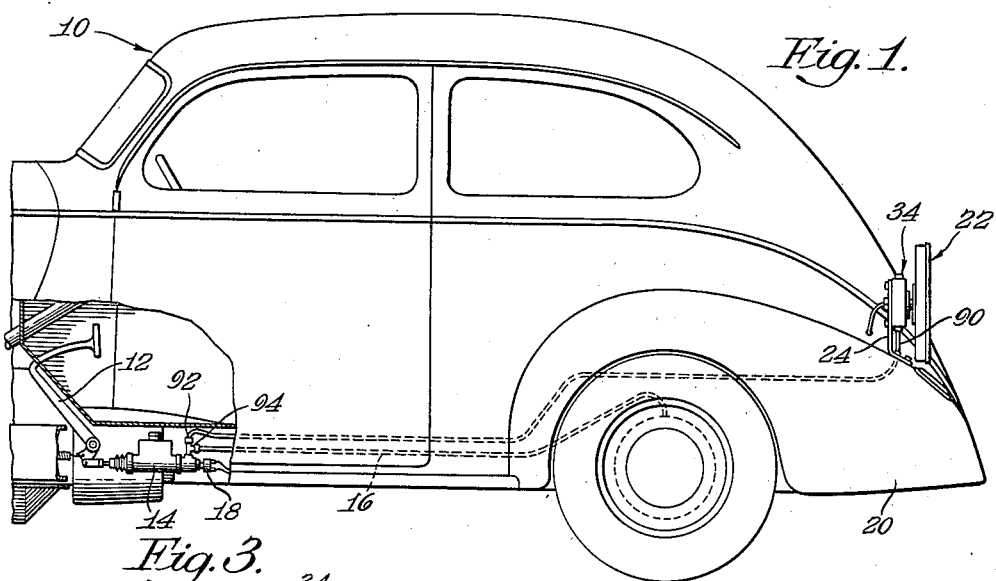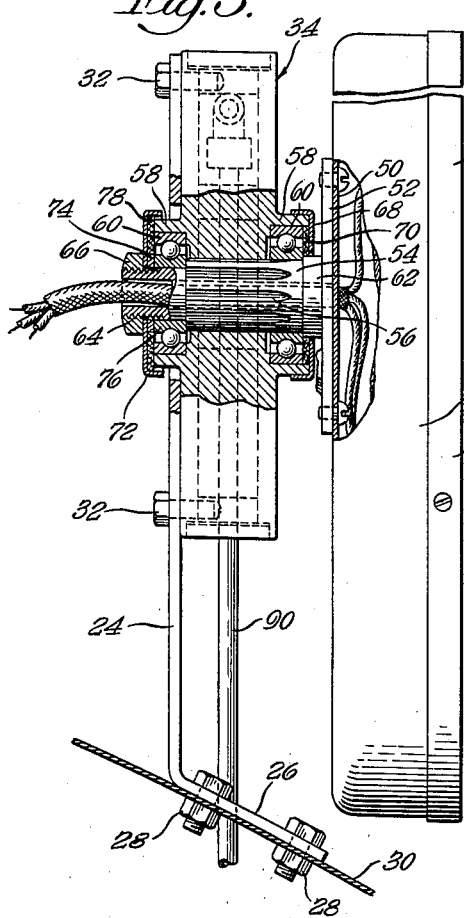

BY Victor J. Evans & Co.
ATTORNEYS

Patented Mar. 17, 1942

2,276,441

UNITED STATES PATENT OFFICE 2,276,441

DIRECTION SIGNAL

Charles D. Warlick and Marma Duke Ijames, Salisbury, N. C.

Application October 3, 1939, Serial No. 297,738

1 Claim. (Cl. 60—54.6)

Our invention relates to automotive vehicles, and has among its objects and advantages the provision of an improved direction signal.

In our copending application on a direction signal, Serial No. 262,028, filed March 15, 1939, we make use of a signal arm shifted to a signalling position through the application of pressure on the brake pedal of the automobile. The signal arm is operatively connected with the hydraulic brake circuit in such manner as to respond to pressure effective on the fluid for shifting the arm from its normally vertical position to its horizontal or signalling position. The signal arm is connected with a linkage operated through the medium of a pressure responsive piston. An object of our present invention is to provide a signalling device along the general lines of that set forth in our abovementioned application, but wherein a more compact and simple operating connection is provided between the signal arm and the pressure responsive piston. More specifically, we make use of a piston in the nature of a rack meshing with a pinion keyed to the arm for rotating the latter to signalling and inoperative positions, with the piston actuated through manipulation of the brake pedal for moving the arm to a signalling position. Resilient means are associated with the piston for positively biasing the latter to its normal position upon reduction of pressure in the brake fluid circuit.

In the accompanying drawings:

Figure 1 is a side elevation of a portion of an automobile showing our invention applied thereto;

Figure 2 is a face view of the signal arm in its normal position;

Figure 3 is an enlarged side elevational view of the signal arm illustrating the manner in which it is rotatably mounted on a support fixed to the vehicle, with the support illustrated in section for the sake of clearness;

Figure 7 is a diagrammatic view of the electric circuit which corresponds to that illustrated in our above-mentioned copending application.

Figure 4:
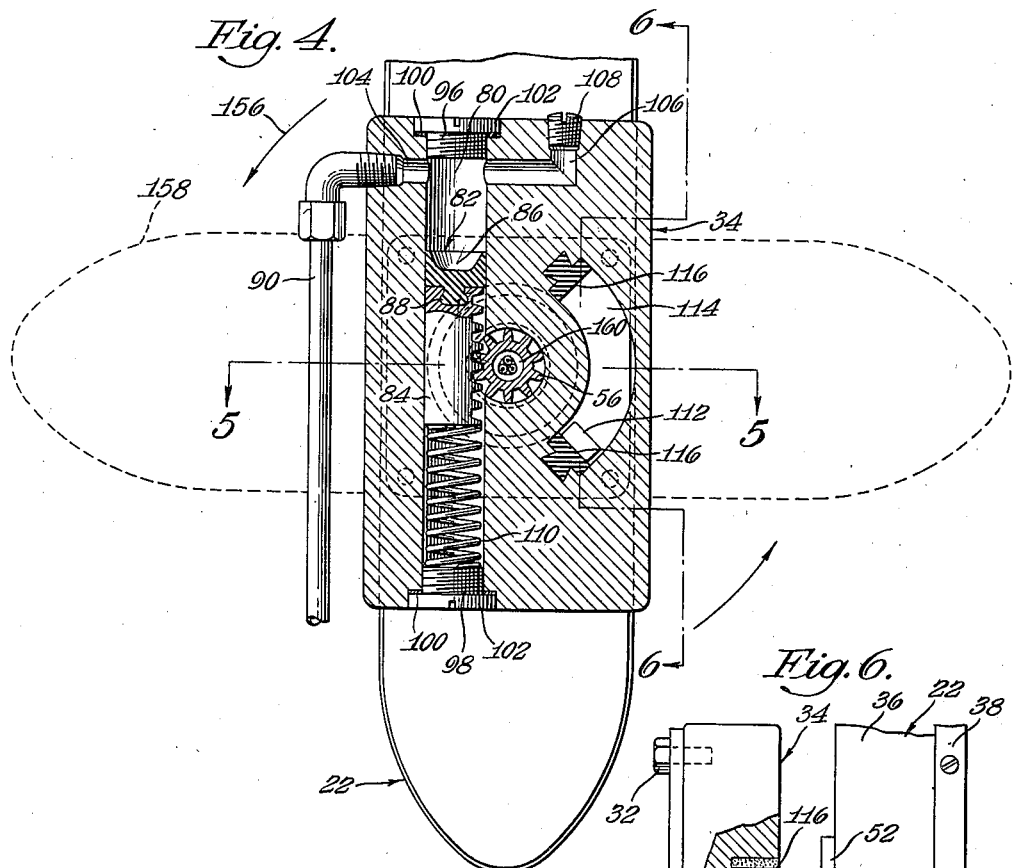
Figure 4 is an enlarged sectional detail view illustrating the piston rack in association with the pinion connected with the signal arm.

In the embodiment selected to illustrate our invention, we make use of an automobile 10 provided with the usual brake lever 12 and master cylinder 14 of the hydraulic brake system of the automobile, one line only of which is indicated at 16 in Fig. 1. Such brake systems are old and well known in the art and need not be described in further detail.

Brake cylinder 14 is actuated through the medium of the brake pedal 12 in the usual manner, and is provided with a conventional stop light switch 18, which is automatically closed when the brake lever 12 is pressed down for brake applying purposes. Such switches are also old and well known in the art.

Upon one of the rear fenders 20 we mount the signal arm 22 through the medium of a bracket 24 which may be welded to the fender. Signal arm 22 normally lies in a vertical position. Fig. 3 illustrates the bracket 24 as having a diagonal run 26 bolted at 28 to the fender 30, and the bracket is bolted at 32 to a body or support 34 in which the signal arm 22 is rotatably journaled.

Referring to Fig. 3, signal arm 22 is in the nature of a box part 36 provided with a cover 38 perforated at 40 and 42, with the perforations taking the configurations of arrows pointing in opposite directions to indicate left and right turns, respectively. Cover 39 is also perforated to provide the word "Stop," as at 44, and the box 36 is provided with partitions 46 and 48 in the manner of the signal arm illustrated in our copending application.

To the wall 50 of the signal arm 22, we bolt a flange 52 fixed to a shaft 54 fashioned to provide a pinion 56.

Figure 5:
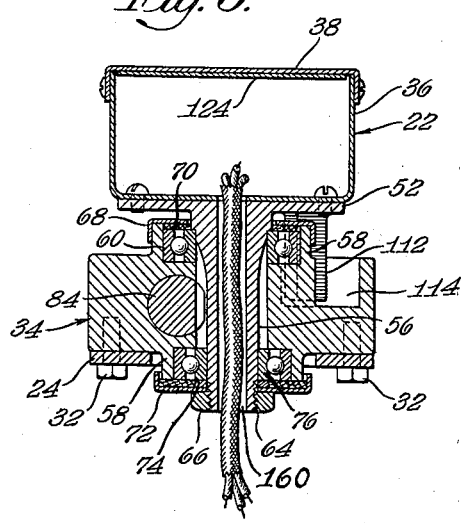
Figure 5 is a sectional view along the line 5—5 of Figure 4.

In Figs. 3 and 5, we illustrate the body 34 as being provided with bored bosses 58 for housing ball bearing assemblies 60 for rotatably mounting the shaft, with the latter provided with a shoulder 62 for holding one of the bearing assemblies in position, and the end of the shaft is reduced in diameter and threaded at 64 for connection with a nut 66 coacting with the other bearing assembly for holding the two assemblies in position and restraining the shaft from relative axial movement. One boss is provided with a frictionally retained cap 68 under which we position a sealing washer 70, and a sealing cap 72 is associated with the other boss and held in place by the nut 66, with a metallic washer 74 positioned between the cap 72 and the inner race 76 of that bearing assembly. A sealing washer 78 is also positioned inside the cap 72.

A body 34 is provided with a bore 80, see Fig. 4, within which we position a slidable piston 82. The piston includes a metallic body or rack 84 meshing with the pinion 56, and one end of the rack is provided with a resilient and cup-shaped head 86 keyed thereto at 88, with the head functioning to provide a seal against the passage of brake fluid in the bore 80 delivered thereto through the medium of a conduit 90 having its other end attached at 92 to a T-coupling 94 associated with the master brake cylinder 14.

The ends of the bore 80 are closed by means of closure plugs 96 and 98 threaded into the bore, with sealing washers 100 interposed between the flanges 102 of the plugs 96 and 98. Conduit 90 communicates with the bore 80 through the medium of a bore 104, and one end of the bore 104 is extended beyond the bore 80 and provided with a right-angular run 106 closed by a screw plug 108. Between the closure plug 98 and one end of the rack 84 we position a compression spring 110 which operates to bias the signalling arm 22 to its normal position when pressure is removed from the brake fluid.

Figure 6:
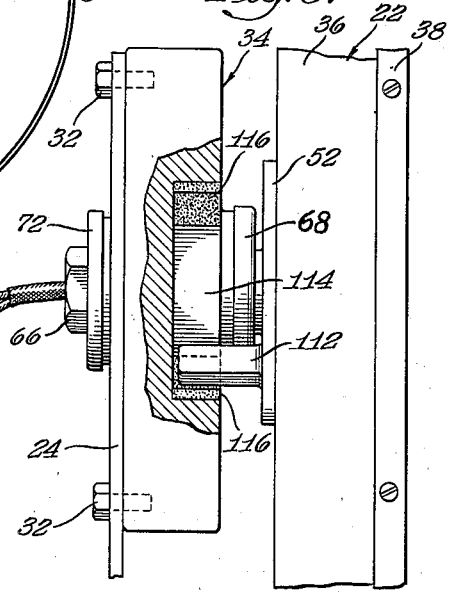
Figure 6 is a view partly in section taken substantially along the line 6—6 of Figure 4.

Signalling arm 22 is provided with a stop element 112, see Fig. 6, which extends into a slot 114 in the body 34, see Fig. 4. The ends of the slot 114 are provided with resilient cushions 116 which constitute bumpers for the stop element 112 in its two extreme positions. Slot 114 is concentrically arranged with respect to the axis of the pinion 56, and the stop element 112 lies adjacent the lower cushioning element 116 when in its normal position, as illustrated in Fig. 4. The slot 114 is of such length as to permit the signal arm 22 to rotate ninety degrees about the axis of the pinion 56 when the latter is rotated through the application of pressure to brake fluid inside the bore 80 for moving the signal arm to a horizontal position for signalling purposes, as illustrated in dotted lines in Figs. 2 and 4. With the signal arm 22 positioned horizontally, the stop element 112 abuts the upper cushioning element 116 of Fig. 4.

In Fig. 7 we illustrate an electric circuit associated with the signal arm 22, which electric circuit includes a left turn lamp 118, a stop lamp 120 and a right turn lamp 122, which lamps are located inside the signal arm and isolated one from the other through the medium of the partitions 46 and 48 in the manner illustrated in our above-mentioned copending application. The perforations 40, 42 and 44 are covered by a light transparent sheet of material 124 of appropriate color, preferably red. Switch 18 is connected with a source of current 126, such as the storage battery of the vehicle, through the medium of a wire 128, and the battery is grounded at 130. A wire 132 leads to the stop lamp 120, and the lamp is connected with a wire 134 grounded at 136, so that the stop lamp 120 will be energized for signalling purposes when pressure is applied to the switch 18, as when the brake pedal 12 is depressed. A wire 138 is connected with the wire 128 and with a manually actuated switch element 140 of a switch 142 which may be located on the steering column of the vehicle or at any desirable and easily accessible place inside the vehicle. Switch 142 includes a contact 144 connected with a wire 146 associated with the right signal lamp 122 so that the circuit will be closed through this lamp when the switch element 140 is moved for bringing its contact 148 into engagement with the contact 144. Similarly, switch 142 includes a contact 150 connected with a wire 152 leading to the left turn lamp 118, so that the circuit will be closed through this lamp when the switch element 140 is shifted for bringing its contact 154 into engagement with the contact 150.

The present invention embodies a switch arm 22 which is shifted to an operating position through manipulation of the brake pedal 12, which manipulation exerts pressure on the brake fluid in the bore 80 for urging the piston 82 downwardly, as when viewing Fig. 4, for rotating the signal arm in the direction of the arrow 156 to its signalling position 158, see Fig. 4. Spring 110 insures positive and certain return of the signal arm to its normal position when pressure is reduced on the brake fluid. Pinion 56 and its actuating piston 82 are so arranged as to effectively actuate the signal arm 22, with the parts arranged in an exceedingly compact manner and designed so as to provide a relatively durable structure. Body 34 constitutes a single piece designed to provide a support for the signal arm 22, which support includes roller bearings therefor. At the same time, the body incorporates the pinion 56 and its actuating piston 82, in addition to coacting with the stop element 112 for positioning the signal arm 22 in its horizontal and vertical positions. The invention is easily associated with conventional vehicles and is rendered operable and may easily be connected with a conventional hydraulic or air brake circuit of conventional vehicles.

Shaft 54 is bored throughout its full length, as at 160 in Fig. 5, for accommodating the wiring of the lamps 118, 120 and 122.

Having thus described certain embodiments of our invention in detail, it is, of course, understood that we do not desire to limit the scope thereof to the exact details set forth except insofar as those details may be defined in the appended claim.

We claim:

In a signal of the character described, comprising a body having means for attachment to a support, a bore extending through said body, a shaft mounted on said bore, a signal arm carried by the outer end of the shaft, a bore extending through the body at right angles to the first mentioned bore and intersecting the same, a pinion carried by the shaft and extending into the second bore, an elongated piston in the second bore and formed with rack teeth meshing with the pinion, a coil spring in the bore and engaging one end of the piston and holding the same in position with the signal arm in an inoperative position, a fluid pressure pipe communicating with the opposite end of the bore for moving the piston against the spring and moving the signal arm to operative position, means for releasing the fluid pressure in the bore, a segmental slot in the body and arranged concentric with the shaft, cushioning means in the ends of the slot, and a stop arm carried by the signal arm and extending into the segmental slot.

CHARLES D. WARLICK.
MARMA DUKE IJAMES.